Patented June 10, 1952

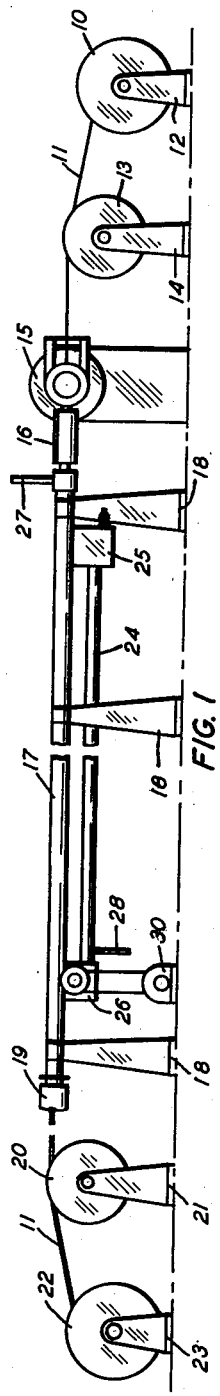

2,599,746

UNITED STATES PATENT OFFICE 2,599,746

ENDLESS CONVEYER FOR SUPPORTING CONDUCTORS OR CABLES IN VULCANIZING TUBES

Thomas K. Cox, Randallstown, Md., assignor to Western Electric Company, Incorporated, New York, N. Y., a corporation of New York Application November 30, 1949, Serial No. 130,174

4 Claims. (Cl. 18—6)

This invention relates to apparatus for coating cable cores, or the like, with compounds of rubber or similar vulcanizable materials, and more particularly to a vulcanizing chamber having an endless conveyor mounted therein for moving a covered cable through the vulcanizing chamber.

In the manufacture of cable having coverings of rubber or rubber-like material vulcanized thereon, it has been found desirable to carry out the vulcanization in a straight vulcanizing chamber for the reason that it is undesirable to bend abruptly a core covered with such a vulcanizable material until the material has become vulcanized fully.

In the vulcanization of rubber or rubber-like compounds on a continuously advancing cable core in a straight vulcanizing chamber, it has been found that the coated core tends to sag due to the length of the cable in the vulcanizing chamber. This tendency is especially great with a cable core of large diameter due to its weight. During the early stages of vulcanization, it has been found that this sagging causes the coating to be dragged along the bottom of the vulcanizing chamber before the coating has been cured sufficiently to keep it from being chafed or scuffed by contact with the body of the vulcanizing tube.

An object of this invention is to provide a conveyor for supporting a cable during the early stages of its travel through a vulcanizing tube and thereby eliminate undesirable chafing and scuffing of the outer coating.

A further object of the invention is to provide an endless conveyor completely enclosed within a vulcanizing chamber thereby eliminating the necessity for seals at the entrance and exit ends of the conveyor.

In accordance with one embodiment of the invention, an auxiliary passageway substantially parallel to and spaced from a straight vulcanizing chamber is in communication with the vulcanizing chamber by means of two spaced compartments located at either end of the auxiliary passageway. An endless conveyor is threaded through the auxiliary passageway and the two spaced compartments in such a manner that it will carry the covered cable, or the like, being vulcanized during its passage through the critical portion of the vulcanizing chamber wherein the undesirable chafing and scuffing of the outer coating would otherwise take place, as explained above.

A complete understanding of the invention may be had by referring to the following detailed description when read in conjunction with the accompanying drawing, wherein Fig. 1 shows a schematic diagram of a complete cable core covering system and Fig. 2 shows an enlarged, vertical cross-sectional view of the vulcanizing chamber and conveyor.

Referring now to Fig. 1, a supply reel 10, having a supply of cable core 11 thereon which is to be covered, is supported by brackets or supports 12. The core 11 passes over a capstan 13 which is supported by brackets or supports 14, and thence through an extruder 15 in which a covering of a vulcanizable rubber or rubber-like comipound is extruded on the continuously moving core. After leaving the extruder 15, the covered cable core passes through a splice outlet box 16 and into a straight vulcanizing chamber 17 which is supported by standards 18. The covered cable core then passes through an exit seal 19 and over a capstan 20 which is supported by supports or brackets 21, and thence to a take up reel 22 which is supported by brackets or supports 23. An auxiliary passageway 24, which has for its purpose the acccommodation of the return portion of an endless conveyor, is in communication with the vulcanizing chamber 17 by means of two spaced compartments 25 and 26. The joints between the vulcanizing chamber 17, the auxiliary passageway 24 and the compartments 25 and 26 are pressure tight. A supply of steam at high pressure for use as the vulcanizing medium is supplied through an entrance pipe 27 and fills the vulcanizing tube 17, the passageway 24 and the compartments 25 and 26. A pipe 28 is provided to drain off condensate to a suitable steam trap (not shown).

Referring now to Fig. 2, a driving sheave 29 is mounted within the compartment 26 and is provided with driving means 30 (Fig. 1). An idler sheave 32 which is mounted in the compartment 25 is also provided, and an endless conveyor 33 which may be of the chain, stainless steel strip, or any other metallic endless type, is threaded through the pasageway 24, around the driving and idler sheaves 29 and 32, respectively, and through a portion of the vulcanizing tube 17. The idler sheave 32 is mounted for rotation on an axle or shaft 34 which is in turn journalled in a journal block 35. The journal block 35 is supported for horizontal movement by slides 43 which are positioned in guideways 44 on the inner walls of compartment 25. A seal 36 is provided in the compartment 25 to allow the passage therethrough of a rod 37 having a head 38 thereon. A fixed bracket 40 on the support 18 (Fig. 2) has a compression spring 41 mounted thereon and the rod 37 extends coaxially through the spring 41. The spring 41, therefore, exerts a force against the inner side of the head 35, thus causing the rod 37 to be pulled to the right (Fig. 2). The left hand end of rod 37 terminates in an enlarged portion 42 which is secured in the sliding journal member 35. Thus it will be seen that an automatic slack take up mechanism is provided which serves to maintain the proper tension on the conveyor 30 at all times.

It is to be noted that the idler sheave 32 and, consequently, the conveyor 33 must be placed at a sufficient distance away from the entrance to the vulcanizing chamber to permit the vulcanizable covering to be vulcanized on the exterior thereof to an extent sufficient to prevent it from sticking to the conveyor. The length of the conveyor 33 is in turn dependent upon the length of time necessary to vulcanize the moving cable sufficiently to prevent damage thereto by subsequent contact with the body of the vulcanizing tube 17. It is further to be noted that, although the auxiliary passageway 24 has been indicated on the drawing as being parallel to the main vulcanizing tube 17, it is obvious that absolute parallelism is not a necessity, since it would be entirely possible to use an idler sheave 32 of a greater or lesser diameter than the driving sheave 29.

It is to be understood that the above-described arrangements are simply illustrative of the application of the principles of the invention. Numerous other arangements may be readily devised by those skilled in the art which will embody the principles of the invention and fall within the spirit and scope thereof.

What is claimed is:

1. In a continuous vulcanization apparatus, the combination of an elongated vulcanizing chamber, means substantially sealing the ends of the vulcanizing chamber for permitting a cable or the like to be advanced through the chamber, means for introducing steam under pressure into the vulcanizing chamber, an elongated auxiliary chamber extending along the bottom of said vulcanizing chamber, a pair of spaced compartments connecting the two chambers, a driving sheave mounted in one of said compartments, an idler sheave mounted in the other of said compartments and supported by a slidable journal member, a spring loaded slack take up mechanism connected to the slidable journal member, and an endless conveyor supported by the two sheaves and threaded through a portion of the vulcanizing chamber, the auxiliary chamber and the compartments, said endless conveyor serving to support a cable or the like having a vulcanizable cover thereon during its passage through the vulcanizing chamber.

2. A continuous vulcanization apparatus including an elongated vulcanizing chamber, means substantially sealing the ends of the vulcanizing chamber, means for introducing steam under pressure into the vulcanizing chamber, an elongated auxiliary chamber parallel to the vulcanizing chamber, compartments connecting the chambers, and an endless belt threaded through a portion of the vulcanizing chamber, the auxiliary chamber and the compartments, said endless belt serving to support a cable or the like having a vulcanizable cover thereon during its passage through a part of the vulcanizing chamber.

3. Continuous vulcanization apparatus including an elongated vulcanizing chamber, an elongated auxiliary chamber extending along the vulcanizing chamber, means substantially sealing the ends of the vulcanizing chamber, compartments connecting the two chambers, and an endless conveyor threaded through a portion of the vulcanizing chamber, the auxiliary chamber and the compartments, said endless conveyor serving to support a cable or the like having a vulcanizable covering thereon during its passage through the vulcanizing chamber.

4. A continuous vulcanizing apparatus, which comprises an elongated vulcanizing tube extending generally horizontally, said vulcanizing tube having a pair of openings in the bottom wall thereof each positioned near one end of the tube, means sealing the ends of the tube and permitting a filamentary article composed at least partially of vulcanizable compound to be advanced continuously through the tube, a generally U-shaped tube sealed to the vulcanizing tube in a position in which the arms of the U-shaped tube communicate with the openings in the vulcanizing tube, a pair of sheaves mounted in the arms of the U-shaped tube, and an endless conveyor element mounted on the sheaves and extending through the U-shaped tube and along the bottom of the interior of the vulcanizing tube for supporting the article as it is advanced through the vulcanizing tube.

THOMAS K. COX.

REFERENCES CITED

The following references are of record in the file of this patent:

UNITED STATES PATENTS

| Number | Name | Date |
|---|---|---|
| 277,019 | Eddy | May 8, 1883 |
| 1,633,591 | Lamplough | June 28, 1927 |
| 1,825,282 | Peelle | Sept. 29, 1931 |
| 1,905,663 | Wallace | Apr. 25, 1933 |
| 2,135,763 | Nicholson | Nov. 8, 1938 |
| 2,200,262 | Daley et al. | May 14, 1940 |
| 2,281,860 | Renault | May 5, 1942 |
| 2,291,344 | Powell | July 28, 1942 |
| 2,373,816 | De Roche et al. | Apr. 17, 1945 |